US 6,910,189 B2

(12) United States Patent
Abdelhadi et al.

(10) Patent No.: US 6,910,189 B2
(45) Date of Patent: Jun. 21, 2005

(54) METHOD, SYSTEM, AND COMPUTER PROGRAM PRODUCT FOR ELECTRONIC MESSAGING MAIL LIST MANAGEMENT

(75) Inventors: Sanaa Abdelhadi, Austin, TX (US); Hypatia Rojas, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 549 days.

(21) Appl. No.: 09/942,744

(22) Filed: Aug. 30, 2001

(65) Prior Publication Data

US 2003/0043201 A1 Mar. 6, 2003

(51) Int. Cl.[7] .................................................. G06F 7/00
(52) U.S. Cl. ............... 715/752; 379/265.09; 379/93.24; 707/10; 709/206
(58) Field of Search ...................... 345/752; 379/265.09, 379/93.24; 709/206; 707/10

(56) References Cited

U.S. PATENT DOCUMENTS 5,630,060 A * 5/1997 Tang et al. ................. 709/238
5,802,314 A * 9/1998 Tullis et al. ................ 709/246
6,072,942 A * 6/2000 Stockwell et al. .......... 709/206
6,128,647 A * 10/2000 Haury ........................ 709/207

OTHER PUBLICATIONS

Microsoft Outlook 2000 SR-1 (9.0.0.4527) Copyright 1995-1999.*
Padwick, Gordon et al., Using Microsoft Outlook 2000, 1999, Indianapolis, Ind. Que, p. 111.*

* cited by examiner

Primary Examiner—Kristine Kincaid
Assistant Examiner—Sajeda Muhebbullah
(74) Attorney, Agent, or Firm—Diana Roberts-Gerhardt; Anthony V S England

(57) ABSTRACT

According to one aspect of the invention, sending an electronic message to two or more sets of recipients includes associating a first portion of an electronic message with a first set of one or more recipients. A second portion of the electronic message is associated with a second set of one or more recipients. The electronic message is sent to the recipients such that the first set of recipients receives the first portion of the electronic message and the second set of recipients receives the second portion of the electronic message.

24 Claims, 7 Drawing Sheets

METHOD, SYSTEM, AND COMPUTER PROGRAM PRODUCT FOR ELECTRONIC MESSAGING MAIL LIST MANAGEMENT

BACKGROUND

1. Field of the Invention

This invention relates to electronic messaging management, and more particularly to a message interface which enables sending a selected portion of an electronic message to one or more selected recipients and another portion of the message to one or more other recipients.

2. Related Art

Electronic messaging, such as e-mail, is such a powerful and desirable tool that it has been referred to as the "killer application" driving early development of the Internet. One reason for the power and popularity of electronic messaging is that it facilitates very efficient communication with groups. In particular, with electronic messaging it is easy to send a message to numerous people all at once. However, when communicating with numerous people it is often desirable to be more selective. For example, it is sometimes best for different members of the group to receive somewhat different messages for reasons of tactfulness, or to save time for one or more of the readers, or to direct the attention of different readers to different aspects of the communication. Conventionally, to meet these different needs independent messages are composed and sent one-by-one to different sets of recipients.

While electronic messaging is a vast improvement over sending hard copy letters, nevertheless generating and sending different electronic messages one-by-one still places a burden on the user, and this conventional electronic messaging practice does not make full use of the capability of modem computer systems, which have the potential to relieve users of this sort of burden. Therefore a need exists for improvements in the generating and sending of related electronic messages to numerous recipients.

SUMMARY OF THE INVENTION

The foregoing need is addressed in the present invention, according to which messages are sent to recipients on a mailing list, and some of the recipients only receive or can only see part of the message, while others on the mailing list receive and can see the whole message. More generally stated, a selected portion of an electronic message is sent to one or more selected recipients and another portion of the message is sent to one or more other recipients.

In one aspect of the invention, a first portion of a message is sent to a first recipient and that portion and a second portion of the message are also sent to a second recipient. Further, this may be done in such a manner that the first recipient does not receive the second portion, nor even any indication that the second portion exists.

Regarding user interface aspects, a messaging user interface is initially presented to a user for composing and sending an electronic message. This interface includes a data entry area such as an area including a text box for the "To" address, another for the "Copy to" address, another for the subject, and another for the body of the message. The user composes the first portion of the electronic message by filling in the addresses for a first set of recipients, subject heading and first message portion. To generate the second portion, the user invokes an additional data entry area in the same message interface and for the same message, including areas for additional sets of addresses, second subject heading and second message portion, so that the second portion of the message may be efficiently entered. The user then sends both portions of the message to the respective sets of recipients with a single send command.

In another aspect, according to an alternative, the user composes all of the message portions of the message in a single message body data entry area, such as in a text box. Then the user selects portions of the message to be selectively sent, invokes an additional data entry areas for respective address and subject heading data entry fields for the selected portions, and fills in the headings and recipient addresses for the respective portions. The user then sends all portions of the message to the respective sets of recipients with a single send command.

In a further aspect, each message portion has an arrangement for selecting whether the message portion is to be sent exclusively to its own set of recipients, or is also to be sent to the respective sets of recipients indicated for the other ones of the message portions.

In a still further aspect, each one of the sets of recipients has an arrangement for selecting whether the recipients in the set are to be sent an indication of the existence of the other ones of the message portions.

In yet another aspect, each one of the sets of recipients has an arrangement for selecting whether the recipients in the set are to be sent the identity of the one or more recipients of the other ones of the message portions.

In a further aspect, the invoking of the additional set of data entry fields is done by a certain user action sequence. In one alternative, the user action sequence is a certain keyboard combination. In another alternative, the user action sequence is a selection of a menu item, using a pointer, a keyboard, or a pointer and keyboard combination. In another alternative, the user action sequence is a selection of an icon using the pointer.

DETAILED DESCRIPTION

Figure 1:
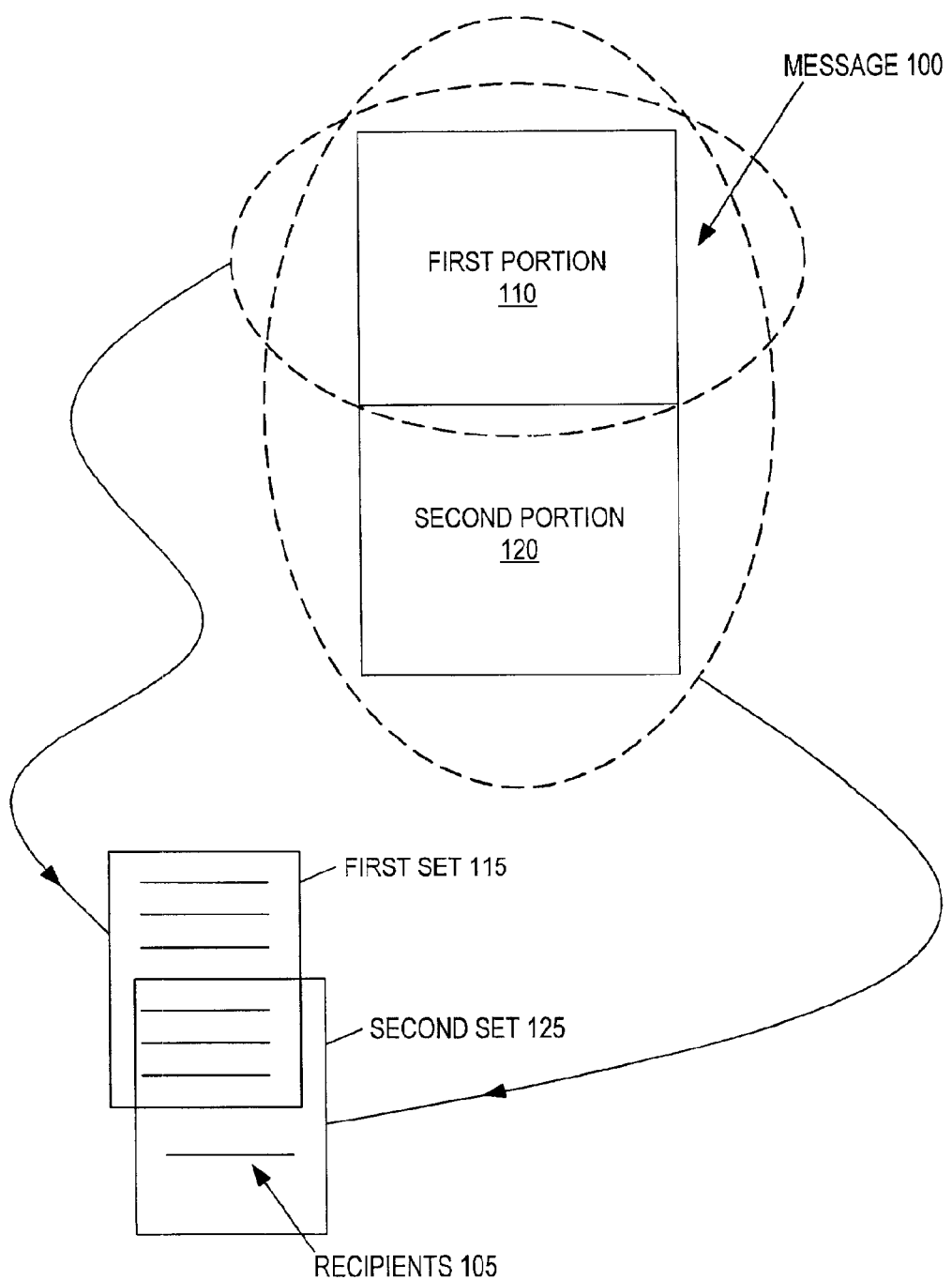
FIG. 1 illustrates first and second sets of recipients for portions of a message, where the message is apportioned into first and second portions, according to an embodiment of the invention.

Referring now to FIG. 1, a message 100 is shown apportioned into a first portion 110 of the message 100 and a second portion 120 of the message 100. Also shown is a list of recipients 105 apportioned into a first set 115 and a second set 125. The recipients 105 are indicated figuratively as lines, but it should be understood that the recipients 105 are listed as addresses. (Note that in the illustrated instance, some of the recipients 105 in the first set 115 are also in the second set 125. This may not be the case in other instances.) In the particular example of FIG. 1, the portion 110 is for sending to its respective set 115 of recipients 105, and the other portion 120 is for sending to both sets 115 and 125 of recipients 105.

Figure 2:
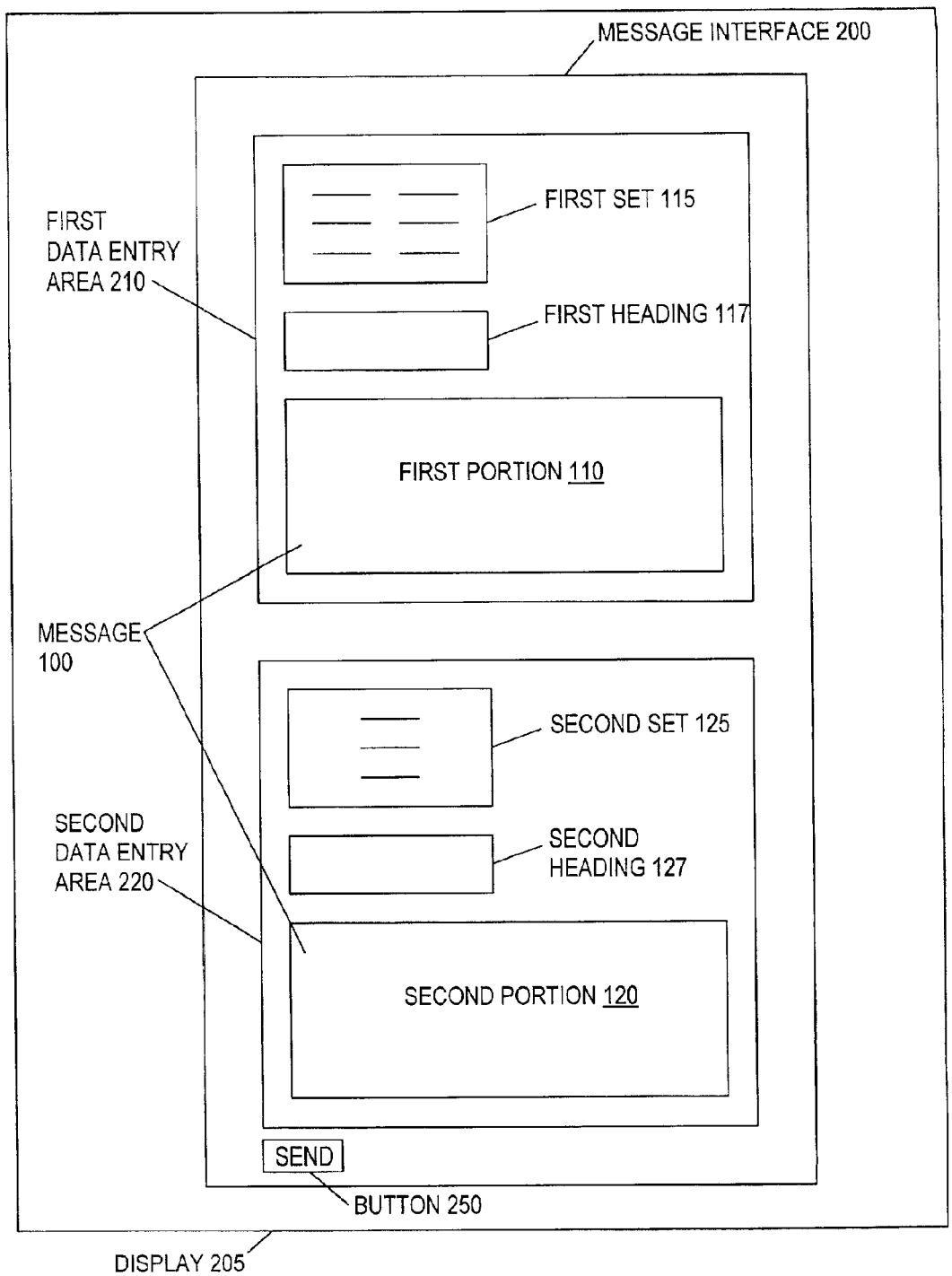
FIG. 2 illustrates aspects of a user interface, according to an embodiment of the invention.

Referring now to FIG. 2, aspects of a user interface for the invention are illustrated, according to an embodiment. In particular, a display 205 is shown on which a message interface 200 is displayed for entering an electronic message 100. The message interface 200 has a first data entry area 210, including areas for indicating the first set 115 of recipients 105 and entering the first portion 110 of the message 100 and a heading 117 for the first portion. A second data entry area 220 may be invoked in the message interface 200 in response to a certain predetermined user action sequence, for indicating the second set 125 of recipients 105 and entering the second portion 120 of the message 100 and a heading 127 for the second portion. (The term "indicating" is used herein in connection with describing the entering of the recipients 105 in the data entry areas 210 and 220, while the term "entering" is used in connection with describing the entry of the message portions 110 and 120 because it is so common for recipients to be on a mailing list so that the user merely selects recipients from the list rather then actually keying them in. However, it should be understood that the term "indicating" is intended to encompass both the action of selecting items from a list and the action of keying in the items from scratch. Likewise, it should be understood that the term "entering" is intended to encompass both the action of selecting items from a list and the action of keying in the items from scratch.) The message interface 200 also has a "send" button 250 for selecting by the user to cause the message to be sent, including the first portion 110 and the second portion 120.

Figure 4:
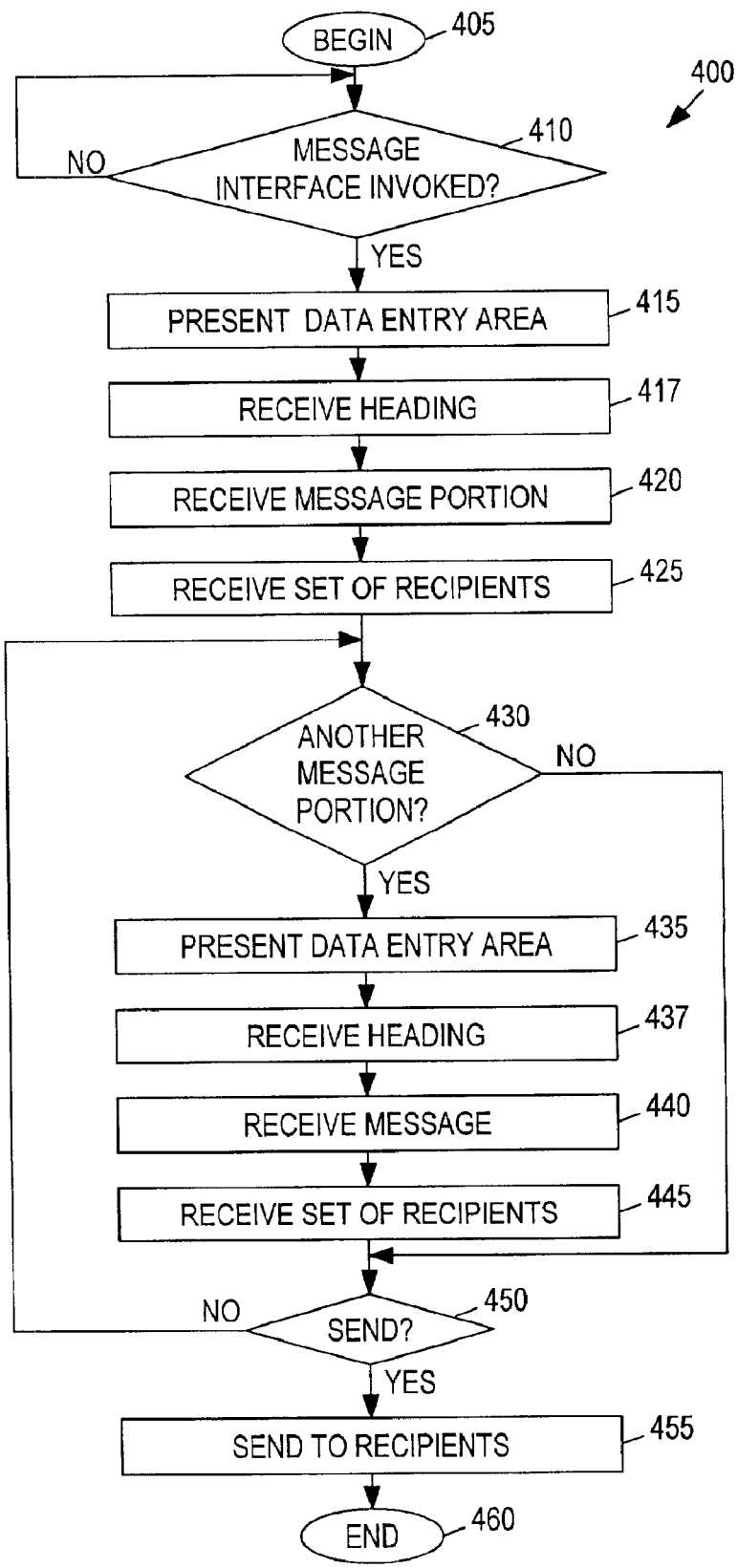
FIG. 4 illustrates certain method aspects of the invention according to an embodiment that corresponds with aspects of the user interface embodiment illustrated in FIG. 2.

Referring now to FIG. 4, an algorithm 400 is shown illustrating certain method aspects of the invention according to an embodiment that corresponds with the aspects of the user interface embodiment illustrated in FIG. 2. The algorithm begins at 405, and then at 410 monitors to see whether the message interface is invoked. If the message interface is invoked, then at 415 the user interface presents the first data entry area on the display. Then, at 417, the system receives the first subject header. Then, at 420, the system receives the first message portion, and at 425 receives the list of the first set of recipients. The recipients in the first set may be associated with the first message portion such that the recipients receive that portion. Alternatively, the recipients are associated with selected ones of the other message portions, as may be specified by the user.

Next, at 430, the system monitors for a user action indicating there is another message portion. If no other message portion is indicated, then at 450 the system monitors for a user action indicating the message should now be sent. If there is no indication that the message should now be sent, the system returns back to monitor, at 430, for the user action indicating there is another message portion, and so on.

If, at 430, the system does detect a user action indicating there is another message portion then, at 435, another data entry area is presented to the user, for receiving the other header, at 437, the other message portion, at 440, and the list for the corresponding set of recipients, at 445. Then, at 450, the system monitors for a user action indicating the message should now be sent. If there is a user action indicating that the message should now be sent, the system sends the message, at 455. This includes sending the respective message portions to the respective sets of recipients. Otherwise, the system returns back to 430 to monitor for the user action indicating there is yet another message portion.

Figure 3:
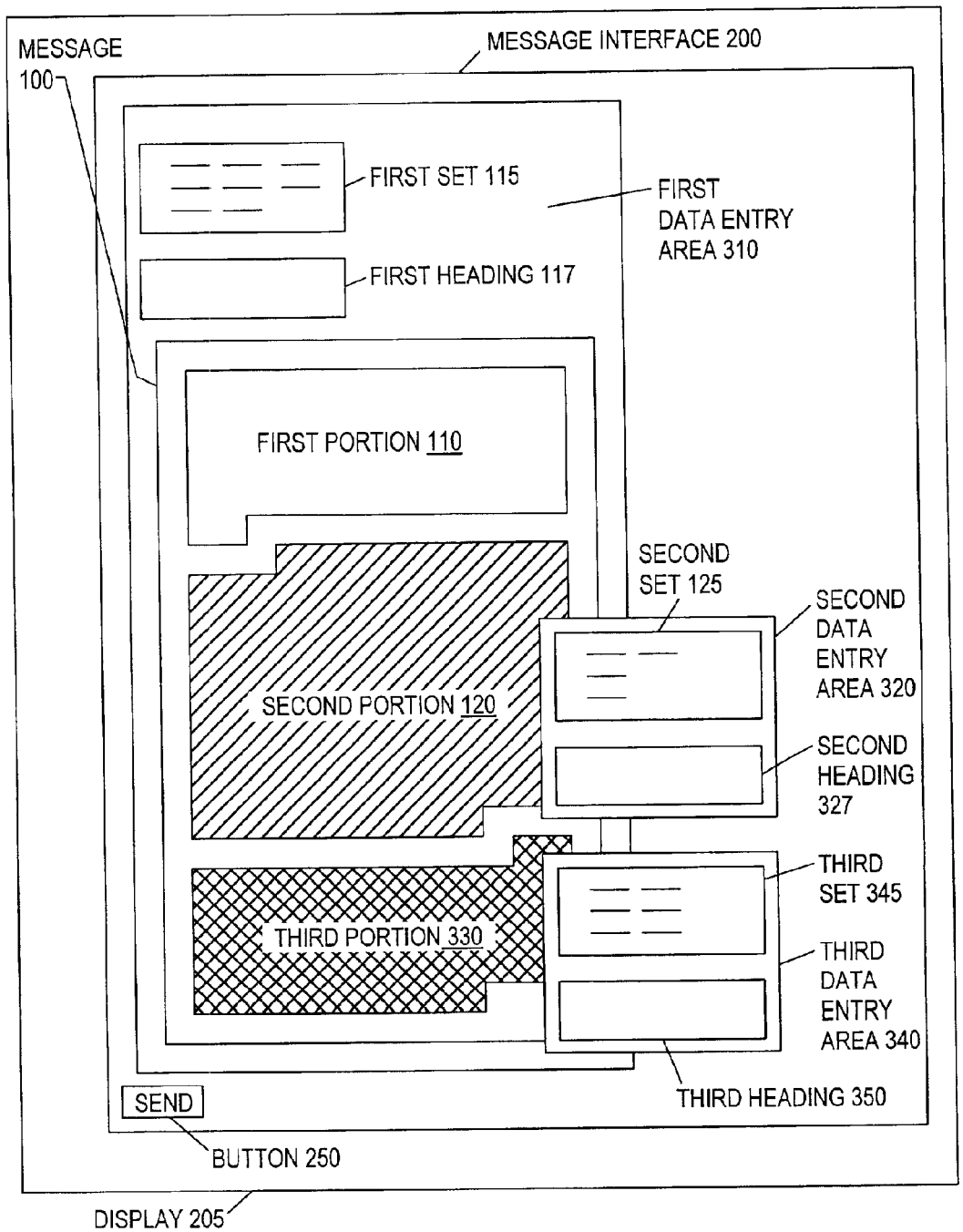
FIG. 3 illustrates aspects of a user interface, according to an alternative embodiment of the invention.

Referring now to FIG. 3, aspects of a user interface for the invention are illustrated, according to another embodiment. A display 205 is again shown on which a message interface 200 is again displayed for entering an electronic message 100. However, in this embodiment the first data entry area 310 includes an area not only for indicating the first set 115 of recipients 105, and entering the first heading 117, but also for entering all the portions of the message 100, which in the example illustrated includes first portion 110, second portion 120, and third portion 330. As will be further described below in connection with FIG. 5, responsive to invoking by a certain predetermined user action sequence, second data entry area 320 is displayed in the message interface 200 for entering the second set 125 of recipients 105 and the second heading 127. Also, responsive to another instance of the user action sequence, a third data entry area 340 is displayed in the message interface 200 for entering a third set 345 of recipients 105 (that is, recipients for the third portion 330 of the message 100) and a third heading 350. The message interface also has the "send" button 250.

Figure 5:
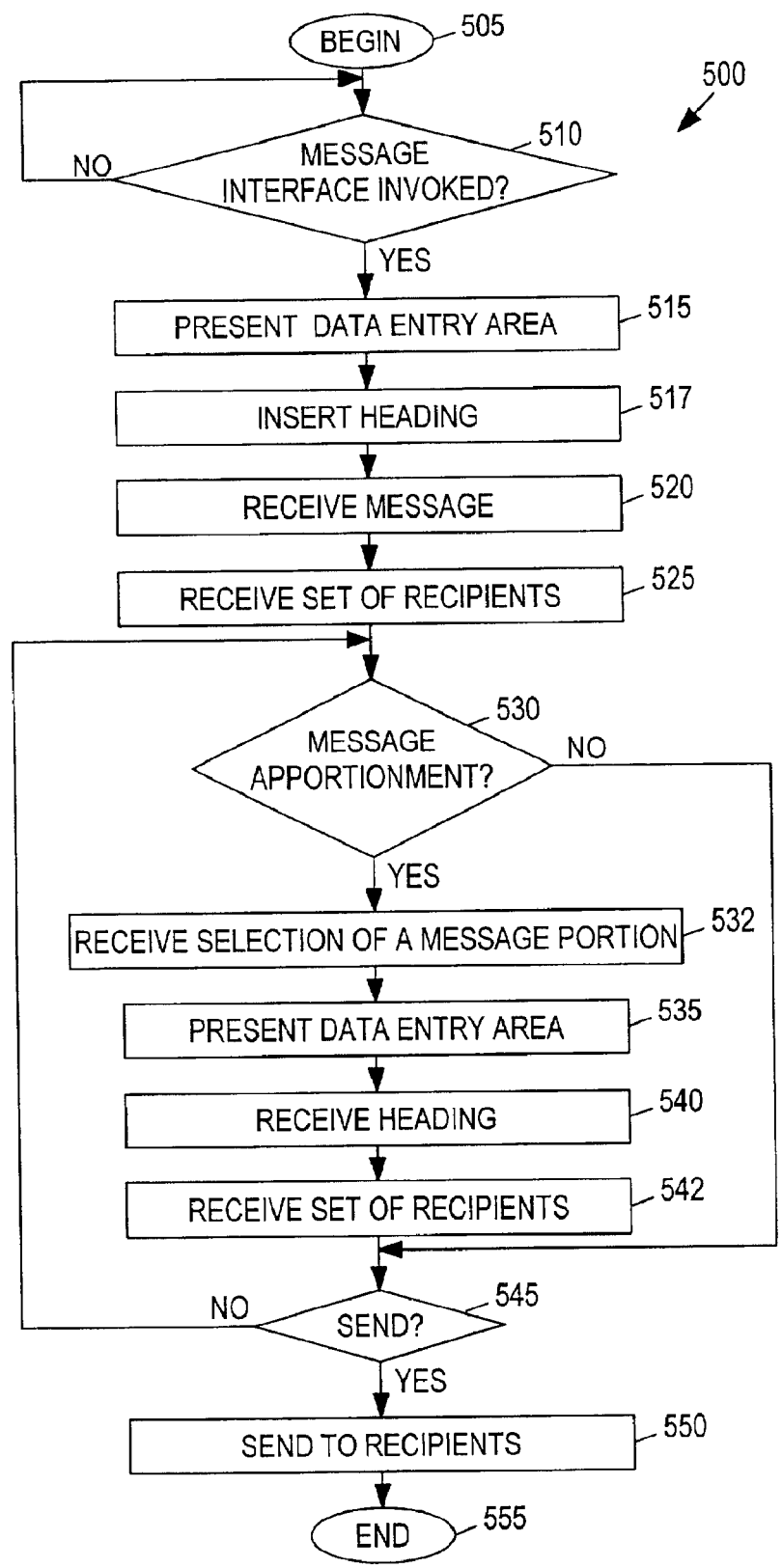
FIG. 5 illustrates certain method aspects of the invention according to an embodiment that corresponds with aspects of the user interface embodiment illustrated in FIG. 3.

Referring now to FIG. 5, an algorithm 500 is shown illustrating certain method aspects of the invention according to an embodiment that corresponds with the aspects of the user interface embodiment illustrated in FIG. 3. The algorithm begins at 505, then at 510 monitors to see whether the message interface is invoked. If the message interface is invoked, then at 515 the user interface presents the first data entry area on the display, for receiving the subject header, at 517, the entire message, at 520, and the list of the first set of recipients, at 525. The recipients in the set may be selectively associated with the entire message, or portions of the message.

Next, at 530, the system monitors for a user action indicating the message is being apportioned. In one embodiment the user action to select an icon using a pointing device. If apportionment is not indicated, then at 545 the system monitors for a user action indicating the message should now be sent. If there is no indication that the message should now be sent, the system returns back to monitor, at 530, for the user action indicating the message is being apportioned, and so on.

If, at 530, the system does detect a user action indicating apportionment, then, at 532, the system receives a selection of a message portion responsive to a certain user action sequence. For example, the user may use a pointing device to select a portion of the message 100 shown on the display 205, such as by placing a pointer at the beginning of the portion, depressing a button on the pointing device, dragging the pointer to the end of the selected portion and releasing the button. Then, at 535, another data entry area is presented to the user, for receiving the next subject header, at 540, and the set of recipients for the message portion, at 542.

Then, at 545, the system monitors for a user action indicating the message should now be sent. In one embodiment, a send button is selected with a pointing device to indicate this. If there is a user action indicating that the message should now be sent, the system sends the message, at 550. This includes sending the respective message portions to the respective sets of recipients. Otherwise, the system returns back to 530 to monitor for the user action indicating there is yet another apportionment of the message.

It should be understood that aspects of both of the above described embodiments may be combined. For example, a message may be composed and apportioned in a first data entry area, according to the embodiment of FIG. 3, and then yet another portion of the message may be composed in another data entry area invoked by a user action, as in the embodiment of FIG. 2.

In another aspect, the association among sets of recipients and respective message portions may be edited. For example, if a first set of recipients was initially associated with first and second message portions, the associations may be edited so that the set of recipients is instead associated with different ones of the message portions. Such editing is invoked by a user action sequence, such as selecting an icon with a pointing device, etc.

Figure 7:
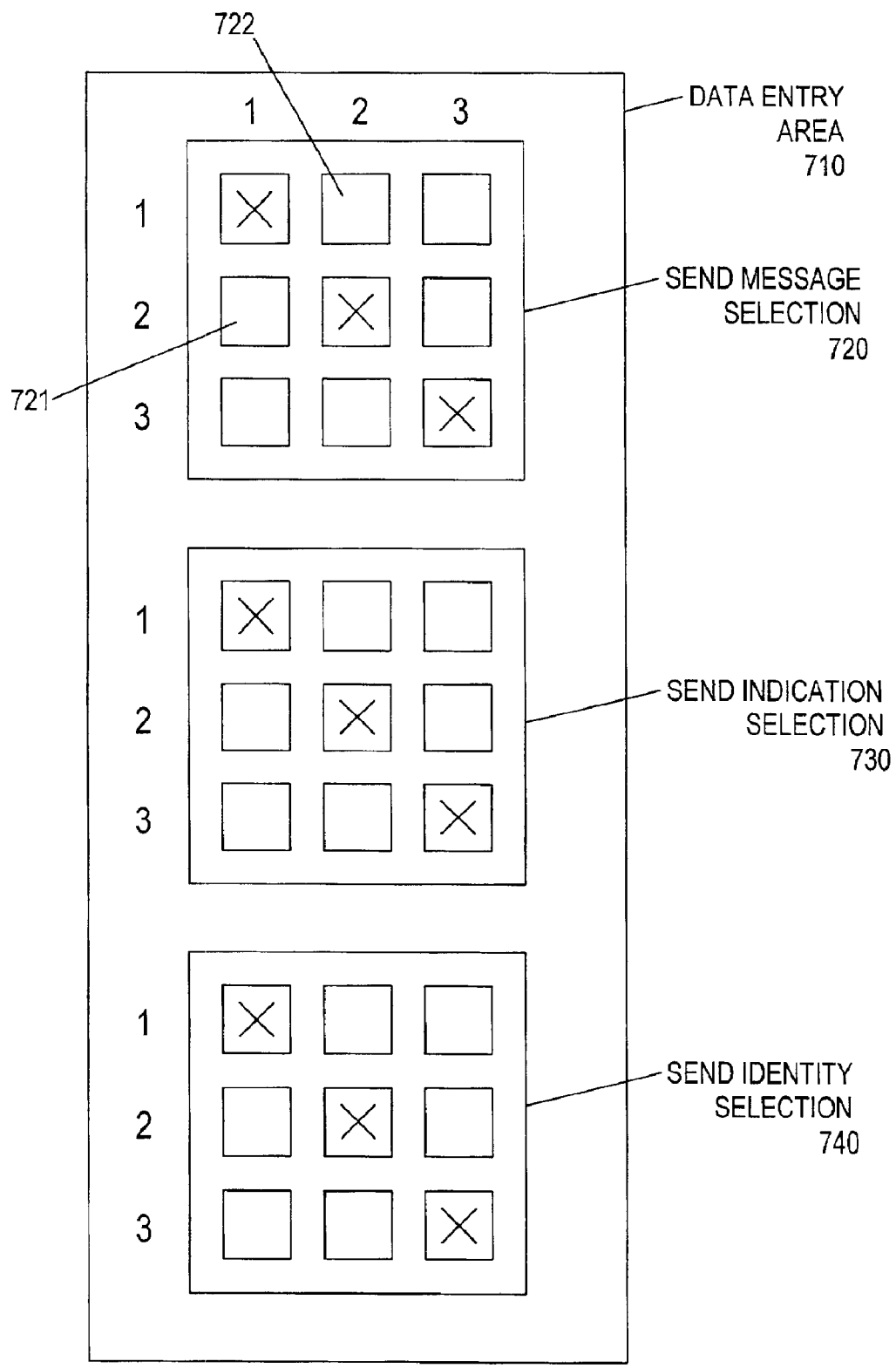
FIG. 7 illustrates a data entry area which permits the sender to select among a number of options which relate to which recipients receive which message portions, or indications of message portions, or identity of recipients of other message portions, according to an embodiment of the invention.

Referring now to FIG. 7, a data entry area 710 is shown which permits the user to select among a number of options which relate to which recipients receive which message portions, or indications of message portions, or identity of recipients of other message portions. The data entry area 710 has a send message selection 720, a send indication selection 730, and a send identity selection 740. The send message selection 720 provides an arrangement for selecting whether each respective message portion is to be sent exclusively to its own set of recipients, or is also to be sent to the respective sets of recipients indicated for the other ones of the message portions. The send indication selection 730 provides an arrangement for selecting whether the recipients in the respective set are to be sent an indication of the existence of the other ones of the message portions. The send identity selection 740 provides an arrangement for selecting whether the recipients in the set are to be sent the identity of the one or more recipients of the other ones of the message portions.

The example illustrated in FIG. 7 is for an instance where there are three message portions, as in the instance illustrated in FIG. 3. Accordingly, the three message portions or corresponding three sets of recipients are represented as rows and columns in each of the selections 720 through 740. Each of the selections has boxes which the user may select or deselect. Thus, for example, if the sender wants to send message portion two to the recipients indicated for message portion one, than the sender selects the box 721 indicated in FIG. 7. Likewise, if the sender wants to send message portion one to the recipients indicated for message portion two, then the sender selects the box 722 indicated in FIG. 7. (Of course, since message portion one will always be sent to the recipients indicated for message portion one, message portion two will always be sent to the recipients indicated for message portion two, and so on, the selection boxes on the diagonals indicated are always selected by default.)

Figure 6:
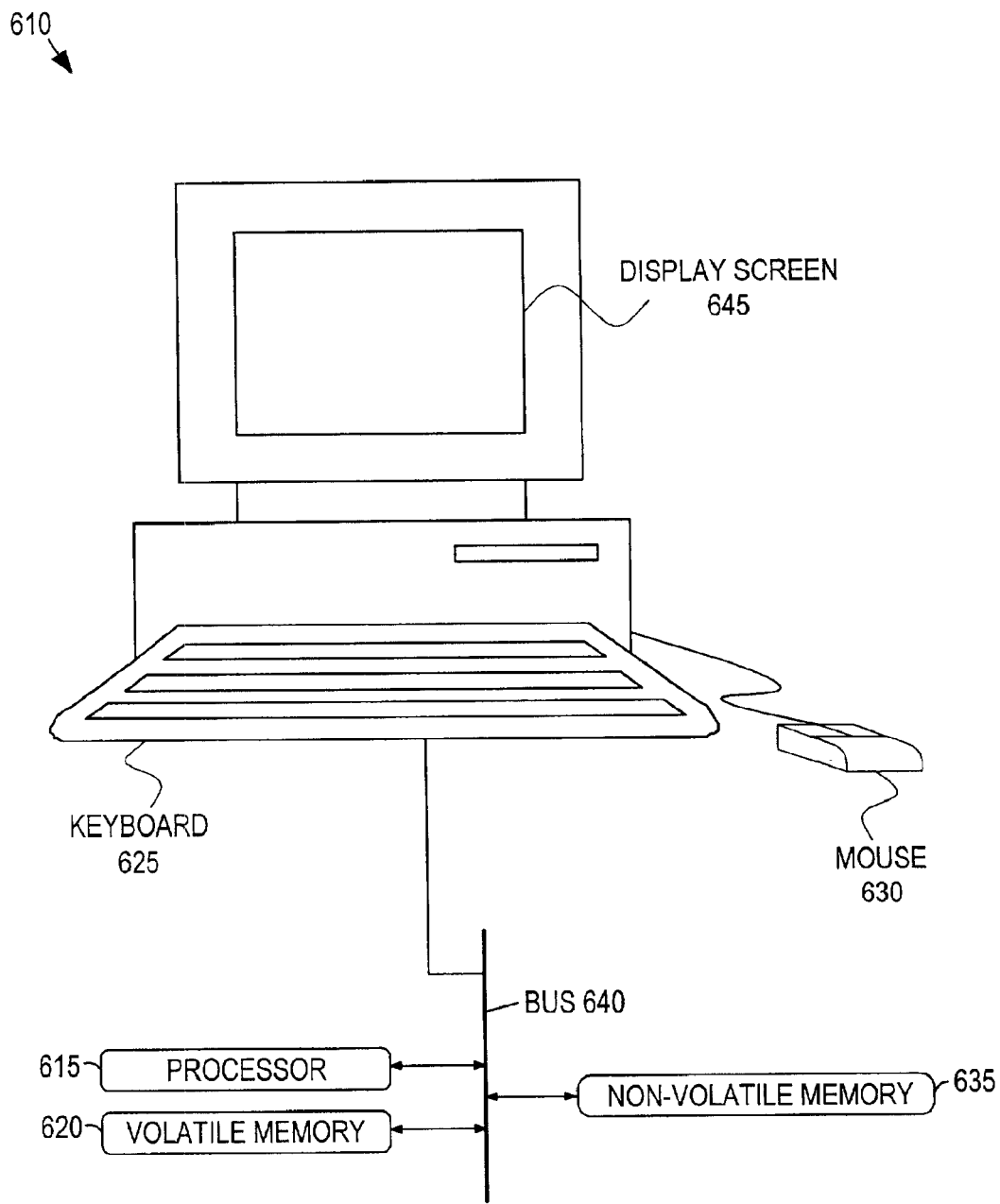
FIG. 6 illustrates a computer system that is generally applicable for an embodiment of the invention.

Referring now to FIG. 6, a computer system 610 is shown that is generally applicable for the embodiment described. The computer system 610 includes a data entry device, which in the illustrated instance is a keyboard 625, and a pointing device, which in the illustrated instance is a mouse 630. (The term "user input device" is used herein to refer to either the data entry or the pointing device.) The computer 610 has a processor 615, a volatile memory 620 (that is, RAM), a nonvolatile memory 635 (for example, ROM, hard disk, floppy disk, CD-ROM, etc.), and a display device 645. The memory 620 and 635 are for storing a program for controlling the processor 615, and the processor is operative with the program to perform as described herein. The display device 645 shown could use a cathode ray tube ("CRT"), liquid crystal, field emission device, or some other type of display element. These components in the device 610 are interconnected by bus 640. The keyboard is a device of the sort that has been referred to herein as a "data entry" device. In other embodiments a data entry device is a microphone for receiving voice commands, or a keypad.

As has been stated herein above, invoking a data entry area is responsive to a certain user action sequence. In various embodiments, the user action sequence includes one or more of the following: i) entering a certain combination on a data entry device, ii) selecting a menu item, using a pointing device, a data entry device, or a pointing device and data entry device combination, or iii) selecting an icon using a pointing device.

It is important to note that while the present invention has been described in the context of a fully functioning data processing system, those of ordinary skill in the art will appreciate that the processes of the present invention are capable of being distributed in the form of a computer readable medium of instructions in a variety of forms and that the present invention applies equally regardless of the particular type of signal bearing media actually used to carry out the distribution. Examples of computer readable media include RAM, flash memory, recordable-type media, such a floppy disk, a hard disk drive, a ROM, and CD-ROM, and transmission-type media such as digital and analog communications links, e.g., the Internet.

It should be appreciated from the foregoing that the invention is advantageous in providing, with improved efficiency, the capability of directing different portions of a message to different recipients in the same message interface for the electronic message and without having to initiate a number of "send" commands. This is in contrast to conventional electronic message interfaces, according to which it is necessary to send a number of messages, one after the other, in order to achieve the effect of directing different aspects of a communication to different recipients. That is, according to the conventional electronic message interface, the user has to invoke a number of instances of the message interface to generate a number of messages. Likewise, the user has to send each one of the messages individually.

The description of the present embodiment has been presented for purposes of illustration, but is not intended to be exhaustive or to limit the invention to the form disclosed. Many additional aspects, modifications and variations are also contemplated. For example, messages with two or three portions have been described, but it should be understood that the number of message portions are not limited. Also, for example, the embodiment described has been for an e-mail type of electronic message, but it should be understood that other embodiments contemplate electonic messages of other types, including file transfer protocol, instant message types. The embodiments were chosen and described in order to best explain the principles of the invention and its practical applications, and to enable others of ordinary skill in the art to understand the invention. Various other embodiments having various modifications may be suited to a particular use contemplated, but may be within the scope of the claims for the present invention.

What is claimed is:

1. A method for electronic messaging management, comprising the steps of:

displaying a message interface for composing and sending an electronic message;

receiving a first portion of the message in the message interface;

receiving, in the message interface, a first set of one or more recipients for the first portion;

receiving a second portion of the message in the message interface, wherein the message interface for composing and sending the electronic message has only a single send button for receiving a send command;

receiving, in the message interface, a second set of one or more recipients for the second portion; and sending the message, wherein both the first and second portions are sent to the respective recipients responsive to a receiving a single send command via the send button and wherein the message portions are sent without receiving an individual send command for the first message portion and without receiving an individual send command for the second message portion;

wherein displaying the message interface comprises the steps of:

displaying a first data entry area for the message; and displaying a second data entry area in the same message interface for receiving the second set of one or more recipients; and wherein the first and second message portions are both received in the first data entry area, the method comprising the step of:

receiving a selection of the second message portion in the first data entry area.

2. The method of claim 1, wherein the second data entry area includes an area for receiving the message of the second message portion.

3. The method of claim 1, wherein the second data entry area is displayed responsive to a certain user action sequence, the user action sequence comprising i) entering a certain combination on a data entry device, ii) selecting a menu item, using a pointing device, a data entry device, or a pointing device and data entry device combination, or iii) selecting an icon using a pointing device.

4. The method of claim 1, comprising the step of receiving a selection of whether one of the message portions is to be sent exclusively to its own set of recipients, or is also to be sent to the set of recipients indicated for the other one of the message portions.

5. The method of claim 1, comprising the step of receiving a selection of whether one of the sets of recipients is to be sent an indication of the existence of the other one of the message portions.

6. The method of claim 5, comprising the step of receiving a selection of whether one of the sets of recipients is to be sent the identity of the one or more recipients of the other one of the message portions.

7. A computer program product for electronic messaging management comprising:

first instructions for displaying a message interface for composing and sending an electronic message;

second instructions for receiving a first portion of the message in the message interface;

third instructions for receiving, in the message interface, a first set of one or more recipients for the first portion;

fourth instructions for receiving a second portion of the message in the message interface, wherein the message interface for composing and sending the electronic message has only a single send button for receiving a send command;

fifth instructions for receiving, in the message interface, a second set of one or more recipients for the second portion; and sixth instructions for sending the message, wherein both the first and second portions are sent to the respective recipients responsive to receiving a single send command via the send button and wherein the message portions are sent without receiving an individual send command for the first message portion and without receiving an individual send command for the second message portion;

wherein the first instructions comprise:

instructions for displaying a first data entry area for the message; and instructions for displaying a second data entry area in the same message interface for receiving the second set of one or more recipients; and wherein the first and second message portions are both received in the first data entry area, the computer program product comprising:

instructions for receiving a selection of the second message portion in the first data entry area.

8. The computer program product of claim 7, wherein the second data entry area includes an area for the message of the second message portion.

9. The computer program product of claim 7, wherein the second data entry area is displayed responsive to a certain user action sequence, the user action sequence comprising i) entering a certain combination on a data entry device, ii) selecting a menu item, using a pointing device, a data entry device, or a pointing device and data entry device combination, or iii) selecting an icon using a pointing device.

10. The computer program product of claim 7, comprising instructions for receiving a selection of whether one of the message portions is to be sent exclusively to its own set of recipients, or is also to be sent to the set of recipients indicated for the other one of the message portions.

11. The computer program product of claim 7, comprising instructions for receiving a selection of whether one of the sets of recipients is to be sent an indication of the existence of the other one of the message portions.

12. The computer program product of claim 11, comprising instructions for receiving a selection of whether one of the sets of recipients is to be sent the identity of the one or more recipients of the other one of the message portions.

13. A system comprising:

a processor connected a network;

a storage device connected to the processor and the network, wherein the storage device is for storing a program for controlling the processor, and wherein the processor is operative with the program to execute the program for performing the steps of:

displaying a message interface for composing and sending an electronic message;

receiving a first portion of the message in the message interface;

receiving, in the message interface, a first set of one or more recipients for the first portion;

receiving a second portion of the message in the message interface, wherein the message interface for composing and sending the electronic message has only a single send button for receiving a send command;

receiving, in the message interface, a second set of one or more recipients for the second portion; and sending the message, wherein both the first and second portions are sent to the respective recipients responsive to receiving a single send command, wherein the message interface for composing and sending the electronic message has only a single send button for receiving a send command;

wherein displaying the message interface comprises the steps of:

displaying a first data entry area for the message; and displaying a second data entry area in the same message interface for receiving the second sex of one or more recipients; and wherein the first and second message portions are both entered in the first data entry area, and wherein the processor is operative with the program to execute the program for performing the step of:

receiving a selection of the second message portion in the first data entry area.

14. The system of claim 13, wherein the second data entry area includes an area for receiving the message of the second message portion.

15. The system of claim 13, wherein the second data entry area is displayed responsive to a certain user action sequence, the user action sequence comprising i) entering a certain combination on a data entry device, ii) selecting a menu item, using a pointing device, a data entry device, or a painting device and data entry device combination, or iii) selecting an icon using a pointing device.

16. The system of claim 13, wherein the processor is operative with the program to execute the program for performing the step of:

receiving a selection of whether one of the message portions is to be sent exclusively to its own set of recipients, or is also to be sent to the set of recipients indicated for the other one of the message portions.

17. The system of claim 13, wherein the processor is operative with the program to execute the program for performing the step of:

receiving a selection of whether one of the sets of recipients is to be sent an indication of the existence of the other one of the message portions.

18. The system of claim 17, wherein the processor is operative with the program to execute the program for performing the step of:

receiving a selection of whether one of the sets of recipients is to be sent the identity of the one or more recipients of the other one of the message portions.

19. A method of sending an electronic message to two or more sets of recipients, the method comprising the steps of:

associating a first portion of an electronic message with a first set of one or more recipients;

associating a second portion of the electronic message with a second set of one or more recipients; and sending the electronic message to the recipients, such that the first set of recipients receives the first portion of the electronic message and the second set of recipients receives the second portion of the electronic message, wherein the first and second message portions are both received in a single data entry area, and the step of associating the second portion of the electronic message with the second set of one or more recipients comprises receiving a selection of the second message portion in the first data entry area.

20. The method of claim 19, wherein the message interface for composing and sending the electronic message has only a single send button for receiving a send command and wherein both the first and second portions of the electronic message are sent to the respective sets of recipients responsive to receiving a single send command, wherein the message interface for composing and sending the electronic message has only a single send button for receiving a send command.

21. A computer program product for sending an electronic message to two or mare sets of recipients, the computer program product comprising:

first instructions for associating a first portion of an electronic message with a first set of one or more recipients;

second instructions for associating a second portion of the electronic message with a second set of one or more recipients; and third instructions for sending the electronic message to the recipients, such that the first set of recipients receives the first portion of the electronic message and the second set of recipients receives the second portion of the electronic message, wherein the first and second message portions are both received in a single data entry area, and the step of associating the second portion of the electronic message with the second set of one or more recipients comprises receiving a selection of the second message portion in the first data entry area.

22. The computer program product of claim 21, wherein the message interface for composing and sending the electronic message has only a single send button for receiving a send command and wherein both the first and second portions of the electronic message are sent to the respective sets of recipients responsive to receiving a single send command via the send button and wherein the message portions are sent without receiving an individual send command for the first message portion and without receiving an individual send command for the second message portion.

23. A system comprising:

a processor connected a network;

a storage device connected to the processor and the network, wherein the storage device is for storing a program for controlling the processor, and wherein the processor is operative with the program to execute the program for performing the steps of:

associating a first portion of an electronic message with a first set of one or more recipients;

associating a second portion of the electronic message with a second set of one or more recipients; and sending the electronic message to the recipients, such that the first set of recipients receives the first portion of the electronic message and the second set of recipients receives the second portion of the electronic message, wherein the first and second message portions are both received in a single data entry area, and the step of associating the second portion of the electronic message with the second set of one or more recipients comprises receiving a selection of the second message portion in the first data entry area.

24. The system of claim 23, wherein both the first and second portions of the electronic message are sent to the respective sets of recipients responsive to receiving a single send command via the send button and wherein the message portions are sent without receiving an individual send command for the first message portion and without receiving an individual send command for the second message portion.

* * * * *

UNITED STATES PATENT AND TRADEMARK OFFICE
CERTIFICATE OF CORRECTION

PATENT NO. : 6,910,189 B2
DATED : June 21, 2005
INVENTOR(S) : Abdelhadi et al.

It is certified that error appears in the above-identified patent and that said Letters Patent is hereby corrected as shown below:

Column 10,
Line 7, please delete "mare", and replace it with -- more --.

Signed and Sealed this

Thirtieth Day of August, 2005

JON W. DUDAS
*Director of the United States Patent and Trademark Office*